US012496052B2

(12) United States Patent
Kim

(10) Patent No.: US 12,496,052 B2
(45) Date of Patent: Dec. 16, 2025

(54) SURGICAL RETRACTOR

(71) Applicant: Kims-Med Co., Ltd., Gwangju (KR)

(72) Inventor: Song Hee Kim, Anyang-si (KR)

(73) Assignee: Kims-Med Co., Ltd., Gwangju (KR)

( * ) Notice: Subject to any disclaimer, the term of this patent is extended or adjusted under 35 U.S.C. 154(b) by 81 days.

(21) Appl. No.: 18/539,915

(22) Filed: Dec. 14, 2023

(65) Prior Publication Data

US 2025/0099093 A1    Mar. 27, 2025

(30) Foreign Application Priority Data

Sep. 27, 2023    (KR) .......................... 10-2023-0129999

(51) Int. Cl.
*A61B 17/02*  (2006.01)
*A61B 90/35*  (2016.01)
*A61B 17/00*  (2006.01)

(52) U.S. Cl.
CPC .............. *A61B 17/02* (2013.01); *A61B 90/35* (2016.02); *A61B 2017/0042* (2013.01); *A61B 2217/005* (2013.01)

(58) Field of Classification Search
CPC ................................ A61B 1/32; A61B 17/02
See application file for complete search history.

(56) References Cited

U.S. PATENT DOCUMENTS

| | | | | |
|---|---|---|---|---|
| 10,512,519 B2* | 12/2019 | Swift | ................. | A61B 1/00108 |
| 2007/0066872 A1* | 3/2007 | Morrison | ............... | A61B 17/02 |
| | | | | 600/245 |
| 2011/0137128 A1* | 6/2011 | Poo | ..................... | A61B 17/0293 |
| | | | | 600/206 |
| 2013/0046316 A1* | 2/2013 | Sullivan | ............... | A61M 1/7411 |
| | | | | 606/115 |
| 2014/0257039 A1* | 9/2014 | Feldman | ................ | A61B 17/02 |
| | | | | 600/205 |
| 2016/0206302 A1* | 7/2016 | Eckermann | ............ | A61B 17/02 |
| 2017/0172555 A1* | 6/2017 | Shimizu | ................... | A61B 1/06 |
| 2018/0008138 A1* | 1/2018 | Thommen | ............ | A61B 17/708 |
| 2018/0014900 A1* | 1/2018 | Vayser | ..................... | A61B 1/06 |
| 2018/0177497 A1* | 6/2018 | Swift | ..................... | A61B 90/30 |
| 2018/0206832 A1* | 7/2018 | Greeley | ................. | A61B 90/30 |

(Continued)

FOREIGN PATENT DOCUMENTS

| | | |
|---|---|---|
| CN | 217090794 U | 8/2022 |
| CN | 115054296 A  * | 9/2022 |

(Continued)

OTHER PUBLICATIONS

Office Action issued in KR 10-2023-0129999; mailed by the Korean Intellectual Property Office on Aug. 21, 2025.

*Primary Examiner* — Jacqueline T Johanas
(74) *Attorney, Agent, or Firm* — Studebaker Brackett PLLC

(57) ABSTRACT

The present disclosure relates to a surgical retractor. The surgical retractor comprises: a handle part; a blade part having a suction hole; a lighting unit including at least one light source disposed on the blade part; a connection port coupled to the handle part or the blade part and having an outlet hole; and a suction channel for guiding smoke from the suction hole to the outlet hole, wherein an end portion of the suction channel on the suction hole side forms a predetermined angle with a longitudinal direction of the blade part.

4 Claims, 9 Drawing Sheets

(56) References Cited

U.S. PATENT DOCUMENTS

| | | | | |
|---|---|---|---|---|
| 2018/0317902 A1* | 11/2018 | Green | ................ | A61B 17/0218 |
| 2020/0046336 A1* | 2/2020 | Swift | ..................... | A61B 17/02 |
| 2021/0186316 A1* | 6/2021 | Thommen | ................ | A61B 1/07 |
| 2021/0401453 A1* | 12/2021 | DiMatteo | ......... | A61B 17/32053 |
| 2022/0054720 A1* | 2/2022 | Hajarian | ................. | A61M 1/86 |
| 2022/0401094 A1* | 12/2022 | Zagatsky | ............... | A61B 90/30 |
| 2023/0191017 A1* | 6/2023 | Manandhar | ........ | A61B 1/00135 |
| 2025/0025145 A1* | 1/2025 | Swift | ..................... | A61B 90/35 |

FOREIGN PATENT DOCUMENTS

| | | | | |
|---|---|---|---|---|
| CN | 116849597 A | * | 10/2023 | |
| JP | 6224593 B2 | | 11/2017 | |
| WO | WO-2011159733 A1 | * | 12/2011 | ............. A61B 17/02 |
| WO | WO-2013044151 A1 | * | 3/2013 | ................ A61B 1/06 |
| WO | WO-2021055882 A1 | * | 3/2021 | ............. A61B 17/02 |
| WO | WO-2024159090 A1 | * | 8/2024 | |

\* cited by examiner

SURGICAL RETRACTOR

CROSS-REFERENCE TO RELATED APPLICATIONS

The present application claims the benefit of priority to Korean Patent Application No. 10-2023-0129999, filed on Sep. 27, 2023, in the Korean Intellectual Property Office. The disclosures of the above-listed application are hereby incorporated by reference herein in their entirety.

TECHNICAL FIELD

The present disclosure relates to a surgical retractor. More specifically, the present disclosure relates to a surgical retractor for providing improved visibility.

BACKGROUND

Securing visibility inside a wound is an essential task for patient safety and surgical success. While early retractors were simply used to expand a wound and provide a view inside the wound, recent retractors are equipped with a light that illuminates the wound area to give a surgeon a better view.

In particular, in mastectomy or breast plastic surgery, retractors are often used in conjunction with electrocautery to cut tissue or perform hemostasis. However, there is a problem in that the smoke generated by the operation of the electrocautery obstructs the surgeon's view.

To solve this problem, a retractor connected to an external negative pressure device and configured to suck in smoke around a blade has been proposed. However, the overlap between the area where the smoke is sucked in and the area illuminated by the retractor's light has resulted in a more severe obstruction of the user's view in some areas.

In addition, in order to embed a suction tube and a circuit board into the retractor, some components of the retractor may be separated from each other and combined through the assembly process, but there is a problem that the patient's body fluid may enter the gap of the joint portion and cause circuit failure.

SUMMARY

In view of the above, the present disclosure provides a surgical retractor capable of providing improved visibility by minimizing the overlap of an illuminated area with an area of intensive smoke inhalation.

In addition, the present disclosure provides a surgical retractor capable of preventing inadvertent introduction of patient's body fluid into the interior of the retractor by ensuring tight fit of respective components.

The objects to be achieved by the present disclosure are not limited to the objects mentioned above, and other objects not mentioned will be clearly understood by those skilled in the art from the description below.

A surgical retractor in accordance with one embodiment of the present disclosure comprises: a handle part; a blade part coupled to one end of the handle part at a predetermined angle with the handle part and having a suction hole; a lighting unit including at least one light source disposed on the blade part; a connection port coupled to the handle part or the blade part, having an outlet hole, and configured to be connected to an external negative pressure device; and a suction channel for guiding smoke from the suction hole to the outlet hole, wherein an end portion of the suction channel on the suction hole side forms a predetermined angle with a longitudinal direction of the blade part.

The suction hole and the light source are spaced apart from each other in the longitudinal direction.

The suction hole is disposed closer to a distal end of the blade part than the light source.

The suction channel includes a suction tube at least a portion of which is inserted into the blade part, and a suction pin that has a bent portion bent at a predetermined angle and is at least partially inserted into an end portion of the suction tube on the suction hole side.

The suction pin includes an insertion pin inserted into the suction tube, a first outer diameter portion disposed outside the suction tube and having a first outer diameter larger than an inner diameter of the suction tube, a second outer diameter portion having a second outer diameter larger than the first outer diameter, and a third outer diameter portion having a third outer diameter larger than the first outer diameter and being spaced apart from the second outer diameter portion, the insertion pin is provided with several protrusions formed along the longitudinal direction of the insertion pin, an outer diameter of the protrusions being gradually reduced as it goes toward an inner side of the suction tube, the second outer diameter and the third outer diameter are larger than a width of the suction hole, and the suction hole is disposed between the second outer diameter portion and the third outer diameter portion.

The blade part includes a support plate extending in the longitudinal direction and a handle insertion portion extending from an end of the support plate on the handle part side toward the handle part, the handle part includes a mounting portion protruding inward from an end of the handle part on the blade part side, a mounting hole is formed on the handle insertion portion at a position corresponding to a position of the mounting portion, and the handle insertion portion is inserted into the handle part and the mounting portion is inserted into the mounting hole.

According to the present disclosure, it is possible to provide improved visibility by minimizing the overlap of the illuminated area with the area of intensive smoke inhalation.

In addition, by ensuring the tight fit of the respective components, it is possible to prevent the inadvertent introduction of the patient's body fluid into the interior of the retractor.

DETAILED DESCRIPTION

Figure 1:
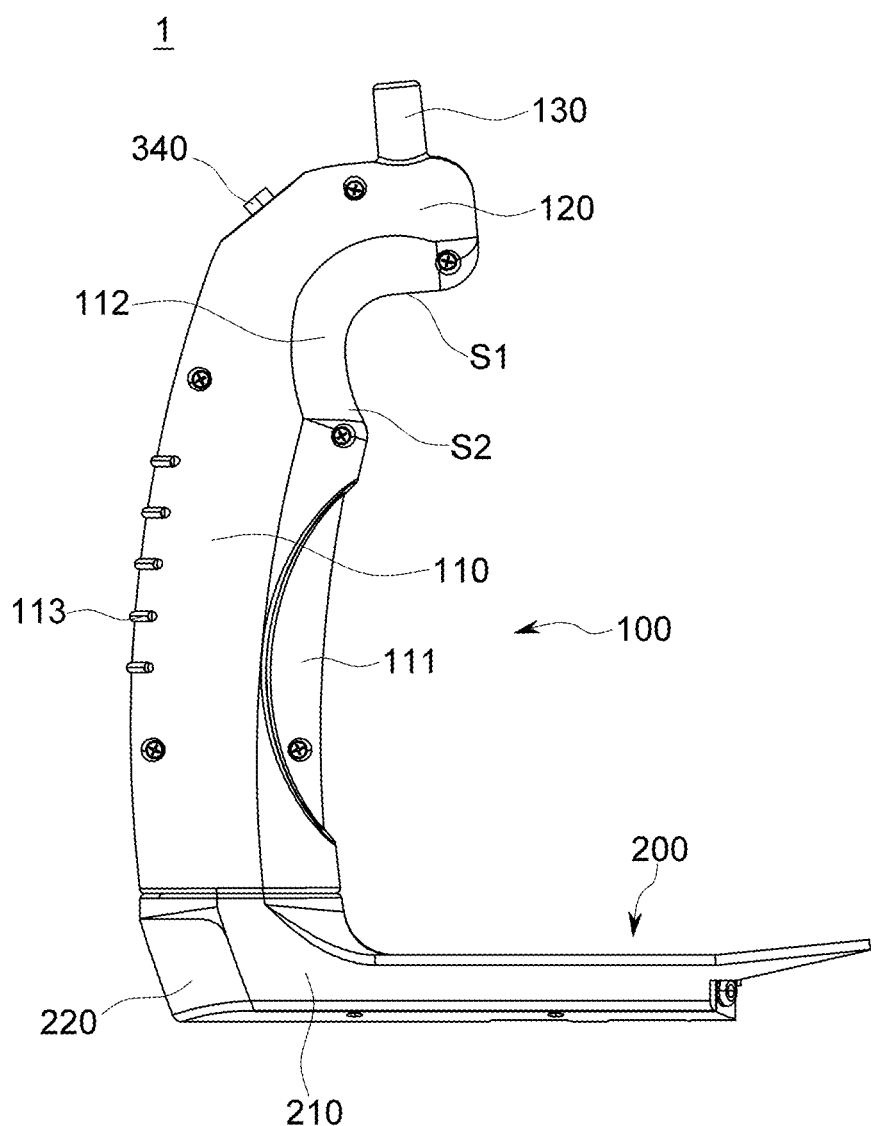
FIG. 1 is a side view of a surgical retractor according to a first embodiment of the present disclosure.

The spatially relative terms "below," "beneath," "lower," "above," "upper," and the like may be used to facilitate describing the relationship of one component to another as shown in the drawings. The spatially relative terms should be understood to include different orientations of the components in use or operation in addition to the orientations shown in the drawings. The components may also be oriented in other directions, and accordingly, the spatially relative terms may be interpreted according to the orientation.

In the present specification, when it is described that a part is connected to another part, this includes not only the case where they are directly connected, but also the case where they are connected with other parts interposed between them. In addition, when a part is said to include a component, it means that the part may further include other components, without excluding other components, unless specifically stated to the contrary.

The terms such as first, second, third, etc. may be used herein to describe various components, but such components are not limited by the terms. The terms are used for the purpose of distinguishing one component from another. For example, without departing from the scope of the present disclosure, a first component may be named a second or third component, etc., and similarly, the second or third component may also be named the first component.

A surgical retractor of the present disclosure includes a handle part, a blade part, a lighting unit, a connection port, and a suction channel. The blade part is coupled at one end of the handle part to form a predetermined angle with the handle part and has a suction hole. A user of the surgical retractor (hereinafter, "user") can observe the interior of a wound area of a patient by gripping the handle part, inserting the blade part into the wound area of the patient, and expanding the wound. The illumination includes at least one light source disposed on the blade part. The light source illuminates the interior of the wound. The connection port is coupled to the handle part or the blade part, has an outlet hole, and is configured to be connected to an external negative pressure device. The suction channel guides smoke from the suction hole to the outlet hole. The smoke generated by cauterizing the tissue of the patient during surgery can be removed from the surgical area by sequentially passing through the suction hole, the suction channel, and the outlet hole to the external negative pressure device. In this case, an end portion of the suction channel on the suction hole side forms a predetermined angle with a longitudinal direction of the blade part. That is, the end portion of the suction channel on the suction hole side is not disposed parallel to the longitudinal direction of the blade part. Accordingly, the area where the smoke is intensively sucked is oriented in a direction different from the longitudinal direction of the blade part, thereby minimizing the obstruction of the view in front of the blade part.

Hereinafter, a surgical retractor according to several embodiments of the present disclosure will be described in detail with reference to the drawings. It should be noted that the present disclosure is not limited to the embodiments described below. For example, the suction hole may be separated from the light source in a height direction other than the illustrated embodiments.

Figure 2:
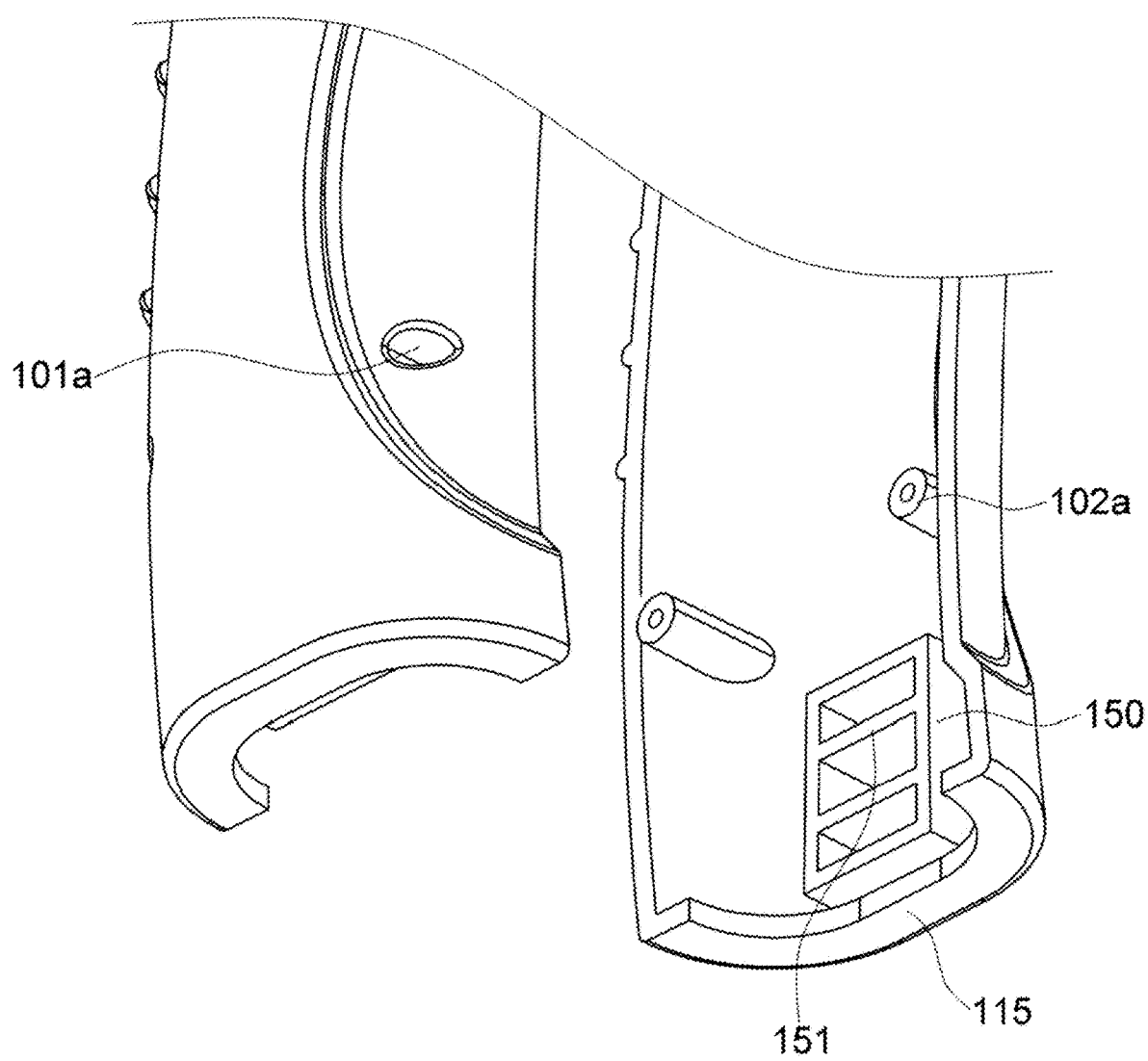
FIG. 2 is an exploded view of a proximal end portion of a handle part according to the first embodiment of the present disclosure.
Figure 3:
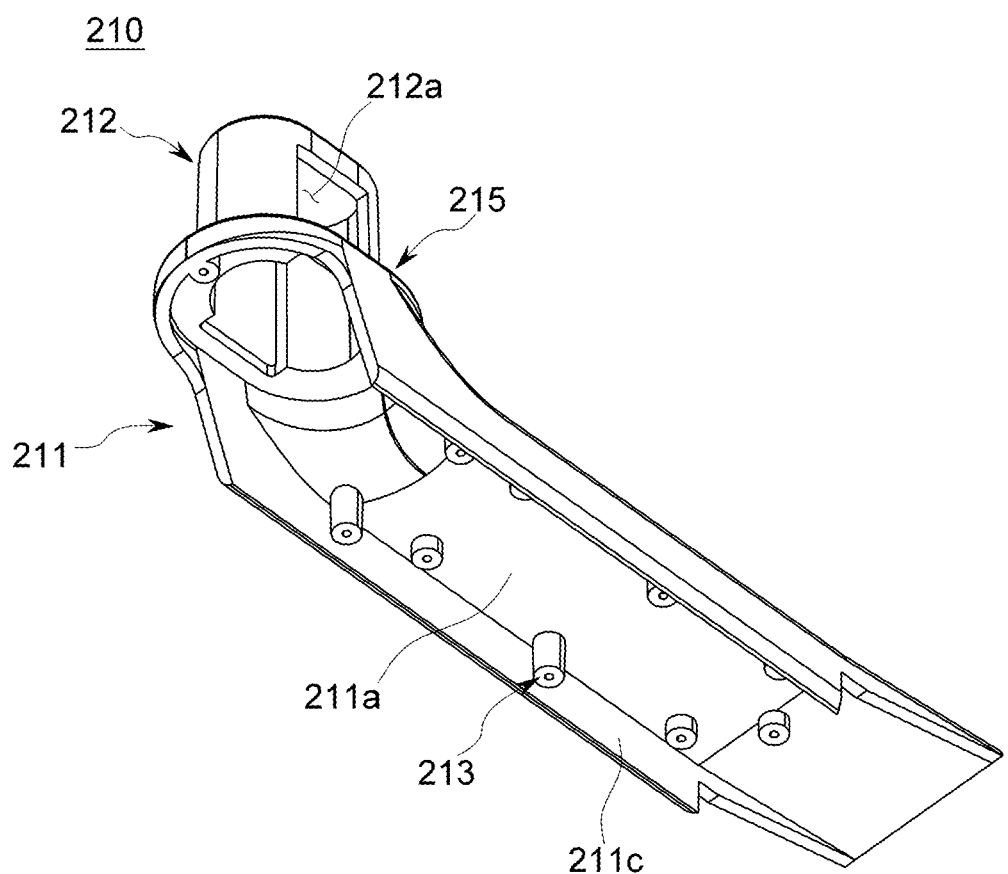
FIG. 3 is a perspective view of a support plate according to the first embodiment of the present disclosure.
Figure 4:
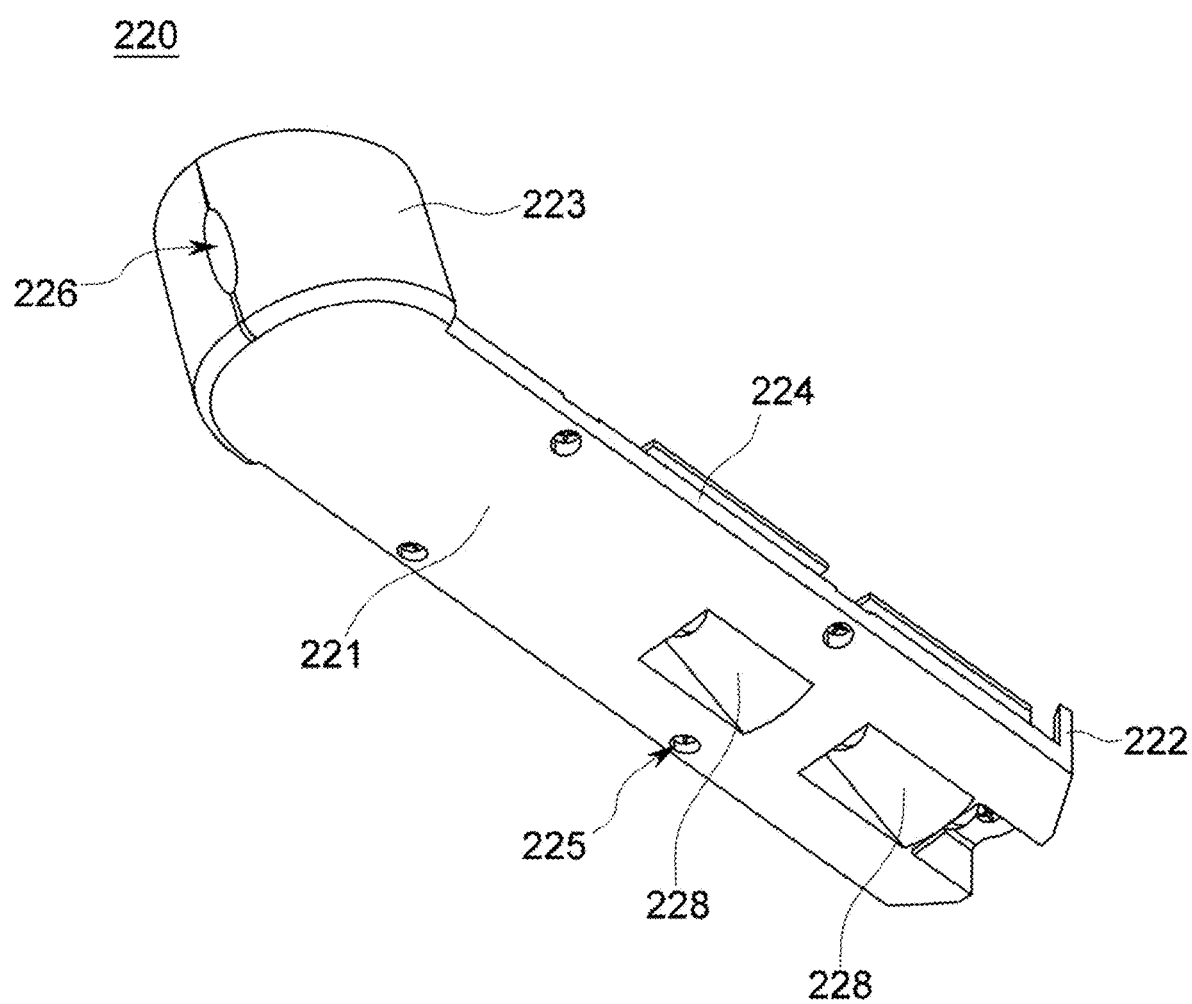
FIG. 4 is a perspective view of a blade cover according to the first embodiment of the present disclosure.
Figure 5:
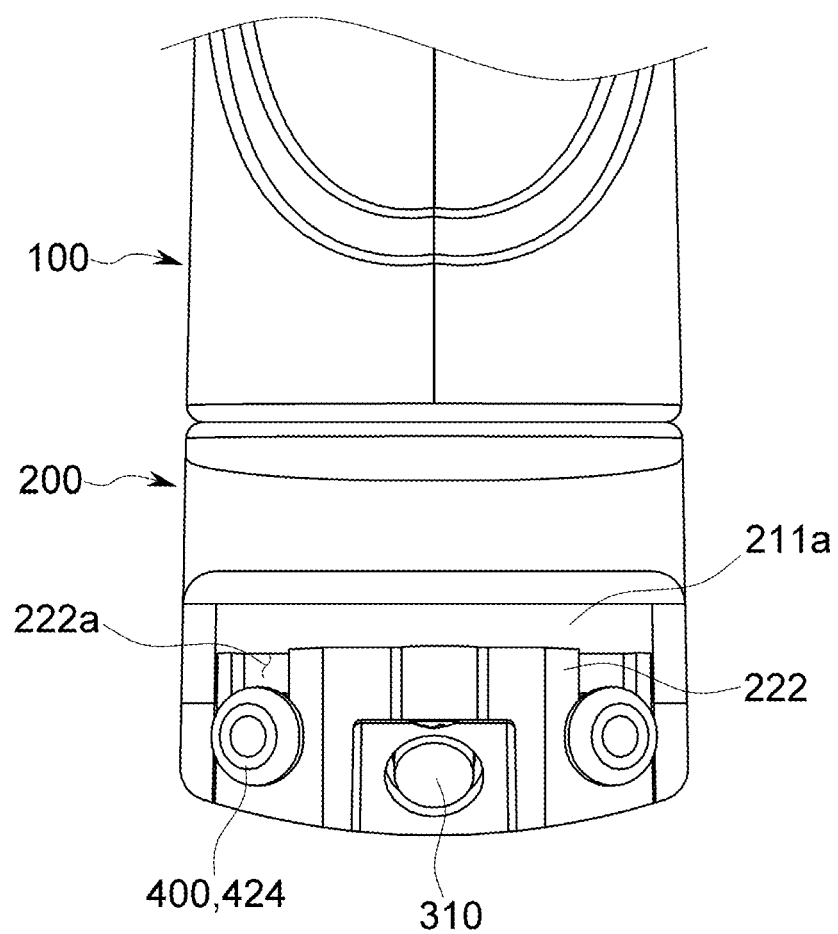
FIG. 5 is a front view illustrating the handle part according to the first embodiment of the present disclosure.
Figure 6:
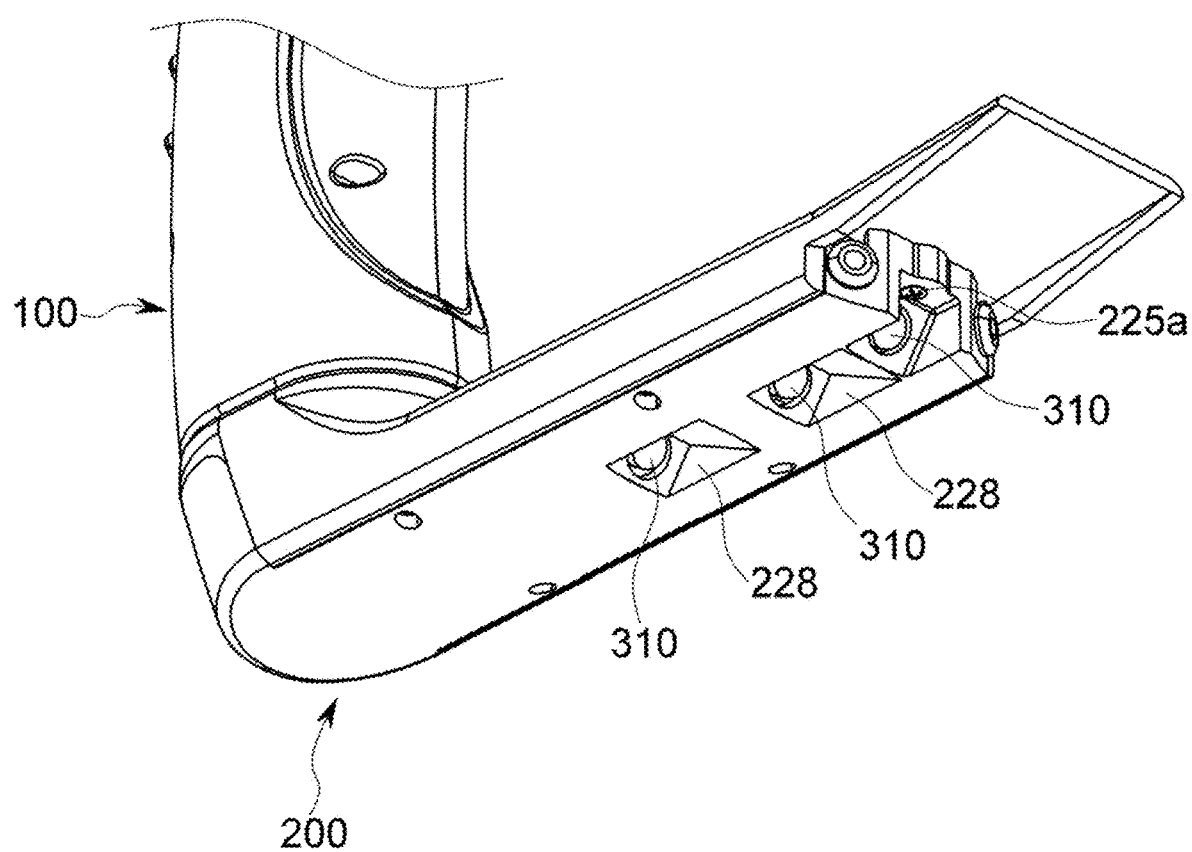
FIG. 6 is a perspective view of the handle part according to the first embodiment of the present disclosure.
Figure 7:
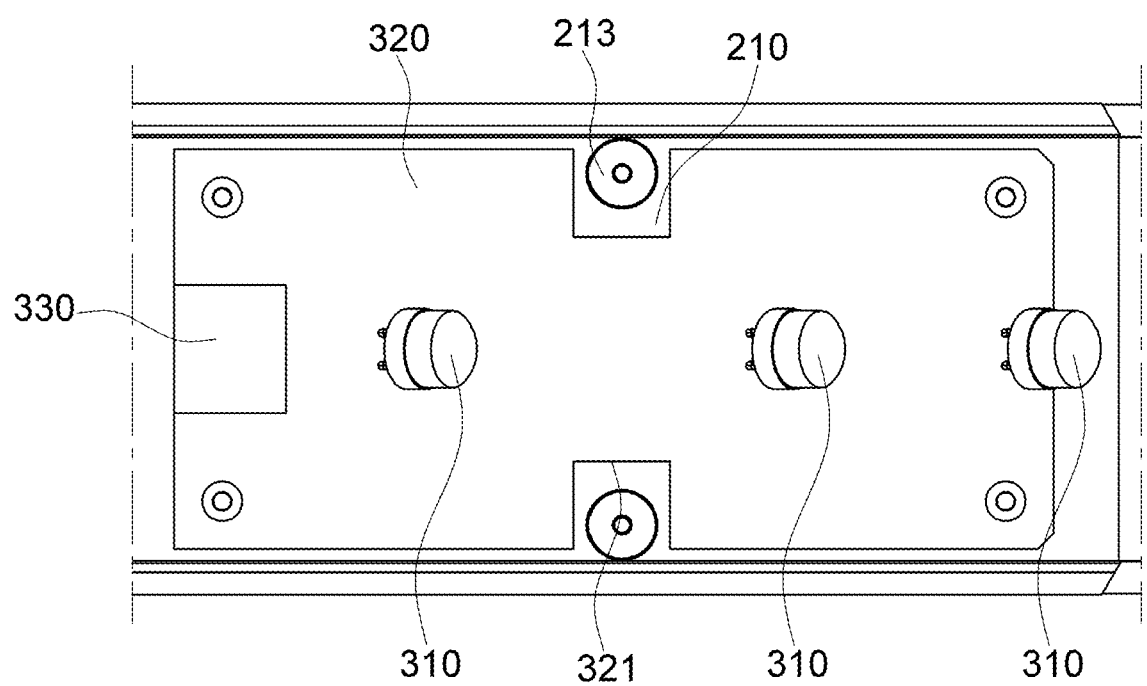
FIG. 7 is an exploded view showing the arrangement of a light source and a circuit board of the present disclosure.
Figure 8:
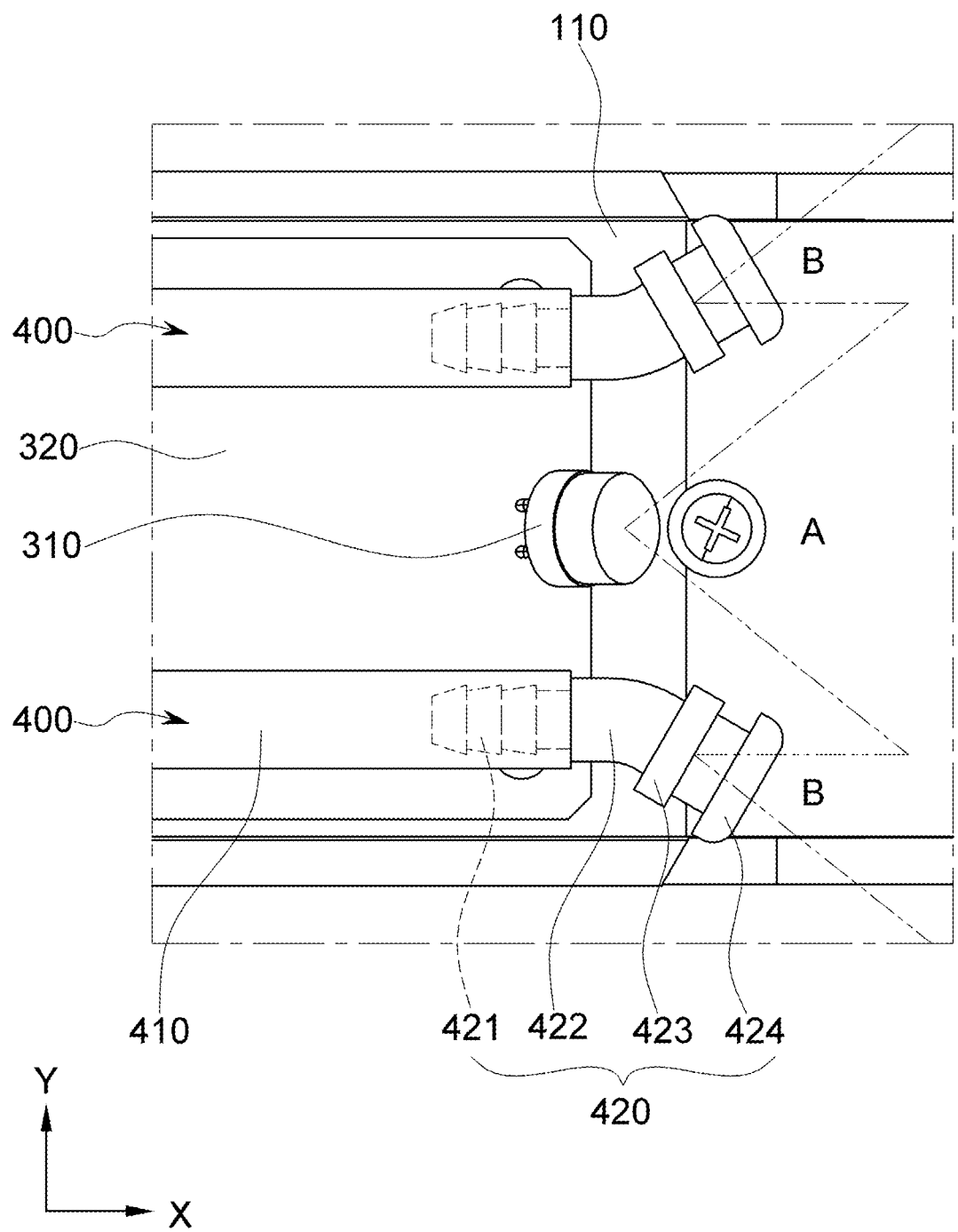
FIG. 8 is a diagram for explaining a suction area and an illumination area of the surgical retractor according to the first embodiment of the present disclosure.

FIG. 1 is a side view of a surgical retractor 1 according to a first embodiment of the present disclosure. FIG. 2 is an exploded view of a proximal end portion of a handle part 100 according to the first embodiment of the present disclosure. FIG. 3 is a perspective view of a support plate 211a according to the first embodiment of the present disclosure. FIG. 4 is a perspective view of a blade cover 220 according to the first embodiment of the present disclosure. FIG. 5 is a front view illustrating the handle part 100 according to the first embodiment of the present disclosure. FIG. 6 is a perspective view of the handle part 100 according to the first embodiment of the present disclosure. FIG. 7 is an exploded view showing the arrangement of a light source 310 and a circuit board 320 of the present disclosure. FIG. 8 is a diagram for explaining a suction area and an illumination area of the surgical retractor 1 according to the first embodiment of the present disclosure.

Referring to FIGS. 1 to 8, the surgical retractor 1 according to the first embodiment of the present disclosure includes a handle part 100, a blade part 200, an illumination, a connection port 130, and a suction channel 400.

The handle part 100 includes a body portion 110, a bent portion 120, and a mounting portion 150. The body portion 110 extends in one direction and has a roughly columnar shape. The body portion 110 is provided with a first recess 111 for guiding the gripping position of the user's hand. The body portion 110 is further provided with protrusions 113 for preventing the user's hand from slipping away from the handle part 100 at locations spaced circumferentially apart from the first recess 111. The protrusions 113 are equally spaced apart along the longitudinal direction of the body portion 110.

The bent portion 120 is bent at a predetermined angle from the distal end of the body portion 110. Specifically, the bent portion 120 is bent in a direction parallel to the longitudinal direction of the blade part 200. A second recess 112 is formed between the bent portion 120 and the body portion 110. The user may use the surgical retractor 1 with the thumb resting on the second recess 112 and the remaining fingers wrapped around the first recess 111. However, the use of the present disclosure is not limited to the present embodiment. In addition to guiding the gripping position of the thumb, the second recess 112 provides the user with a pressing surface to facilitate rotation of the surgical retractor 1. Specifically, the user can tilt the surgical retractor 1 in one direction by pressing a lower surface S1 of the bent portion 120 with the thumb, or the user can easily tilt the surgical retractor 1 in the other direction by pressing a lower surface S2 of the second recess 112 with the thumb. The area of the first recess 111 is formed to be larger than the area of the second recess 112.

Referring to FIG. 2, the mounting portion 150 protrudes inwardly from the end of the handle part 100 on the blade part 200 side. Specifically, two mounting portions 150 having a roughly rectangular shape protrude inwardly from the body portion 110, and ribs 151 for reinforcing the mounting portions 150 are provided inside the mounting portions 150. The mounting portion 150 is inserted into a mounting hole 212a formed in the blade part 200. In addition, the handle part 100 may be configured to be bisected along a longitudinal direction and separable into two half-pieces. The separated handle part 100 can be assembled by tightening screws into screw assembly portions 101a and 102a divided on both sides. With such configurations, components disposed inside the handle part 100 can be easily assembled.

The handle part 100 is provided with a switch 340 for controlling power supply to the light source. The handle part 100 may include therein a power source for supplying power to the light source 310 and wires connecting the power source to the circuit board 320. The connection port 130, which will be discussed below, may protrude upwardly from the bent portion 120 of the handle part 100. While the connection port 130 and the handle part 100 are shown as being integrally formed with each other in the drawings, the connection port 130 and the handle part 100 may be fabricated separately and then assembled.

Referring to FIGS. 1 to 5, the blade part 200 of the present disclosure includes a support portion 210 and a blade cover 220. The support portion 210 includes a support plate 211*a* extending longitudinally to support the tissue of the patient, a handle insertion portion 212 extending from an end of the support portion 210 on the handle part 100 side toward the handle part 100, and first side guards 211*c* extending downwardly from both sides of the support plate 211*a*. The distal end of the support plate 211*a* is bent upwardly at a predetermined angle so that the support plate 211*a* can stably support the tissue of the patient. The handle insertion portion 212 is inserted into the handle part 100 and the mounting portion 150 is inserted into the mounting hole 212*a*. The handle insertion portion 212 prevents the blade part 200 from deviating horizontally. The handle insertion portion 212 protruded longitudinally from the handle part 100 is supported by the inner surface of the handle part 100 to prevent separation of the handle insertion portion 212 and the handle part 100 in the event that the blade part 200 is unintentionally over-rotated by a particularly strong pressing force or the like. The mounting portion 150 is inserted into the mounting hole 212*a* of the handle insertion portion 212 so that the support portion 210 and the handle part 100 are fixedly coupled to each other. However, the present disclosure is not limited to the present embodiment and the handle part 100 and the blade part 200 may be formed integral with each other. The first side guards 211*c* are bent downward from both sides of the support plate 211*a*. The mounting hole 212*a* is formed on the handle insertion portion 212 at a position corresponding to the position of the mounting portion 150.

The blade cover 220 includes a first bent portion 222 bent upward from a distal end thereof, a second bent portion 223 bent upward from a proximal end thereof, a cover plate 221, and second side guards 224 bent upward from both sides of the cover plate 221, a lighting groove 228 recessed in the cover plate 221, and a lighting hole formed in the lighting groove 228. The cover plate 221 is inserted between the first side guards 211*c* on both sides of the support part 210. The first side guard 211*c* of the support portion 210 restrains the lateral movement of the cover plate 221, and the first bent portion 222 and the second bent portion 223 of the blade cover 220 restrain the forward and backward movement of the blade cover 220. In this case, the second side guards 224 of the cover plate 221 and the first side guards 211*c* of the support portion 210 are brought into surface-contact with each other so that the sealing of the blade part 200 can be maintained. The location and number of the lighting holes correspond to the location and number of light sources 310. A mounting surface on which the lighting hole is formed forms a predetermined angle with a plane to which the blade part 200 belongs. The first bent portion 222 has a downwardly recessed groove that defines a portion of the boundary of a suction hole 222*a*, which will be described below.

Referring to FIGS. 5 to 7, three light sources 310 are arranged on the blade part 200 to be spaced apart from each other along the longitudinal direction of the blade part 200. The light sources 310 may be arranged to have the same normal line as the mounting surface. Referring to FIG. 7, the light sources 310 are connected to the circuit board 320 embedded in the blade part 200. The circuit board 320 has a third recess 321 formed in the horizontal direction. A screw assembly portion 213 protruding inwardly from the support plate 211*a* is disposed inside the third recess 321. When assembling the surgical retractor 1, the assembly of the circuit board 320 can be facilitated by inserting the screw assembly portion 213 in the third recess 321 before completely fixing the circuit board 320 to the blade part 200.

Referring to FIGS. 5, 7, and 8, the blade part 200 is provided with a suction hole 222*a* for suctioning smoke. In order to prevent the patient's body tissue from flowing into the suction channel 400 and clogging the suction channel 400, the suction hole 222*a* is spaced apart from a distal end of the blade part 200. The suction hole 222*a* is defined by the blade cover 220 and the support portion 210. That is, a portion of the edge of the suction hole 222*a* is formed by the blade cover 220 and the remaining portion is formed by the support portion 210. Three light sources 310 are disposed in a central portion of the blade part 200 along the longitudinal direction of the blade part 200, and a pair of suction holes 222*a* is disposed symmetrically relative to each other with respect to a longitudinal center axis of the blade part 200.

The end portion of the suction channel 400 on the suction hole 222*a* side forms a predetermined angle with the longitudinal direction of the blade part 200. In this case, the predetermined angle may be an angle within a range of 30 degrees to 60 degrees. In FIG. 8, an area A shows an illumination area of the light source 310, and areas B show an area where smoke is intensively sucked (hereinafter referred to as a "suction area"). The surgical retractor 1 of the present disclosure provides improved visibility by minimizing the overlap of the illumination area and the suction area. Furthermore, to further improve the visibility, the suction holes 222*a* and the light source 310 may be spaced apart along the longitudinal direction of the blade part 200. Specifically, the suction holes 222*a* may be disposed closer to the distal end of the blade part 200 than the light source 310. The suction holes 222*a* may also be disposed closer to the side surfaces of the blade part 200 than the light source 310.

The suction channel 400 includes a suction tube 410 that is at least partially inserted into the inside of the blade part 200, and a suction pin 420 that is at least partially inserted into the end portion of the suction tube 410 on the suction hole 222*a* side. The suction pin 420 has a bent portion 422 that is bent at a predetermined angle. In this case, the suction tube 410 may be made of a flexible material and the suction pin 420 may be made of a rigid material. When the suction pin 420 is made of a rigid material, it is possible to prevent unintentional change of the orientation of the end portion of the suction channel 400 on the suction hole 222*a* side. When the suction pin 420 is made of a flexible material, it can be anticipated that unintentional stretching of the bent portion 422 may occur. However, the materials of the suction tube 410 and the suction pin 420 are not limited to the present embodiment. For example, the suction tube 410 as well as the suction pin 420 may be made of a rigid material.

The suction tube 410 may have a "Y" shape and be disposed inside the blade part 200 or the handle part 100 such that the branched portions face the respective suction holes 222*a* and the tail portion faces the outlet hole. Alternatively, the surgical retractor 1 may be configured to have two suction channels 400 that do not communicate with each other, so that if one suction channel 400 is blocked, suction of smoke can be continued through the other suction channel 400.

Referring to FIG. 7, a connection block 330 is disposed on a lower surface of the circuit board 320 to which power supply wires are connected. The connection block 330 may serve to facilitate assembly of the surgical retractor 1 by connecting the wires to the circuit board 320 and allowing the branched portions of the suction tube 410 to be divided and disposed on both sides of the connection block 330.

The suction pin 420 includes an insertion pin 421 which is a portion inserted into the suction tube 410, a first outer diameter portion 422 disposed on the outside of the suction tube 410 and having a first outer diameter larger than an inner diameter of the suction tube 410, a second outer diameter portion 423 having a second outer diameter larger than the first outer diameter, and a third outer diameter portion 424 having a third outer diameter larger than the first outer diameter and spaced apart from the second outer diameter portion 423. The size relationship between the second and third outer diameters is not particularly limited. The insertion pin 421 is provided with several protrusions, an outer diameter of which is gradually reduced as it goes toward the inner side of the suction tube 410, formed along a longitudinal direction of the insertion pin 421, to prevent separation of the insertion pin 420 from the suction tube 410. The suction pin 420 may be inserted into and fixed to the suction hole 222a so that the suction hole 222a of the blade part 200 is disposed between the second outer diameter portion 423 and the third outer diameter portion 424. In this case, the second outer diameter of the second outer diameter portion 423 and the third outer diameter of the third outer diameter portion 424 are larger than a width of the suction hole 222a, so that the suction pin 420 is prevented from deviating from the suction hole 222a. In addition, in order to prevent the suction pin 420 from moving up and down, a distance between the circuit board 320 and the top of the suction hole 222a is shorter than the first outer diameter so that the first outer diameter portion 422 can be sandwiched between the suction hole 222a and the circuit board 320. By placing the suction pin 420 and the suction channel 400 on the circuit board 320 coupled to the support portion 210, and then coupling the blade cover 220 to the support portion 210, the suction pin 420 can be easily fixed to the suction hole 222a. In order to prevent body tissue or the like of the patient from entering the suction channel 400, it is preferable that the end of the suction pin 420 does not extend beyond the edge of the blade part 200.

Some components of the surgical retractor 1 according to the first embodiment of the present disclosure are mutually separable, which facilitates the assembly process of the surgical retractor 1. However, it should be considered that since there is a clearance other than the suction hole 222a in the surgical retractor 1, it is required to prevent blood from flowing into the surgical retractor 1 through a passage other than the suction channel 400. Therefore, the surgical retractor 1 according to the first embodiment has a structure to maintain airtightness. For example, the end portion of the handle insertion portion 212 on the support portion 210 side is bent radially outwardly. The bent surface is brought in surface-contact with the end surface of the handle part 100 on the blade part 200 side to maintain the airtightness of a joint portion between the handle part 100 and the blade part 200. In addition, the second side guard 224 of the cover plate 221 and the first side guard 211c of the support portion 210 are brought in surface-contact with each other to maintain the airtightness of the handle part 100. Although not shown, a transparent light cover that covers the lighting hole or a light source plate that is coupled to the light source 310 and blocks the lighting hole may be additionally provided. At the distal end of the cover plate 221, a screw assembly portion 225a (see FIG. 6) is formed between the suction pins 420 on both sides to bring the support portion 210 and the blade cover 220 into close contact. In order to prevent the handle part 100 from being split into two pieces by the handle insertion portion 212, an outer diameter of the handle insertion portion 212 is preferably smaller than an inner diameter of the handle part 100.

Figure 9:
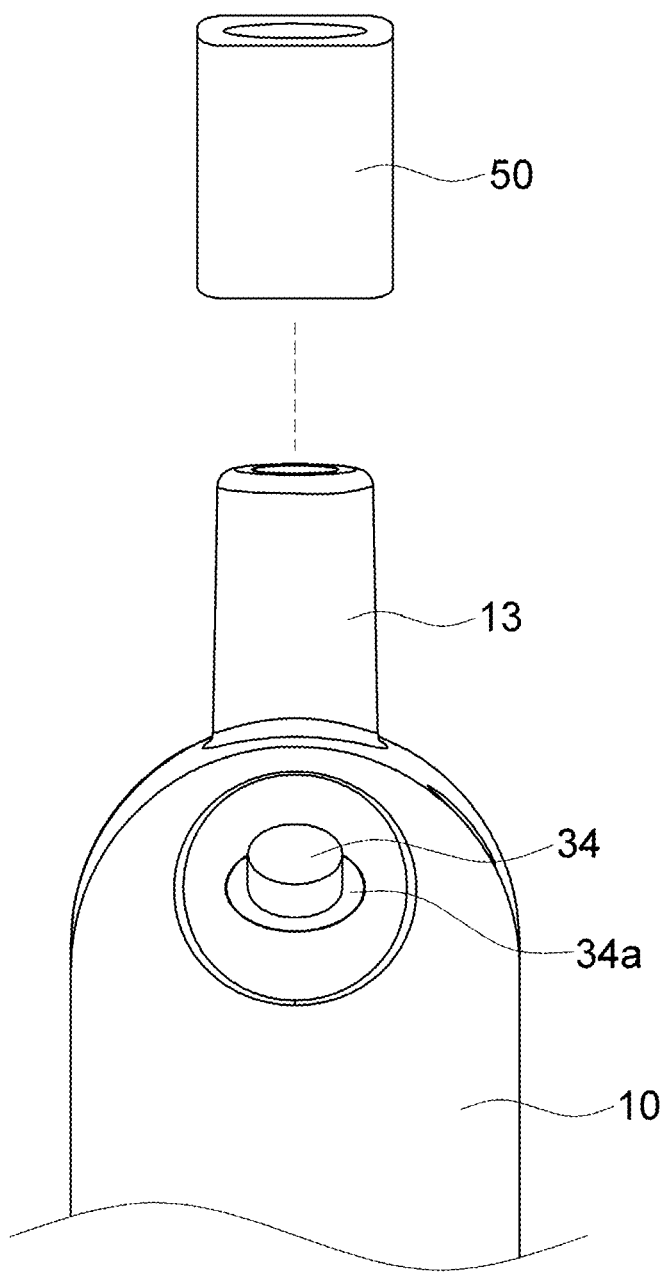
FIG. 9 is a view illustrating a handle part and a connection port of a surgical retractor according to a second embodiment of the present disclosure.

FIG. 9 is a diagram showing a handle part 10 and a connection port 13 of a surgical retractor 2 according to a second embodiment of the present disclosure. In describing the surgical retractor 2 according to the second embodiment of the present disclosure, the description of the components that are substantially the same as those of the surgical retractor 1 according to the first embodiment will be omitted, and the components substantially identical to or corresponding to those of the first embodiment have the same name as those of the first embodiment. Referring to FIG. 9, the surgical retractor 2 according to the second embodiment includes an elastic band 50 which is fitted on an outer peripheral surface of a connection port 13 and coupled to the connection port 13, and an elastic surface 34a which is coupled to a light switch 34 and brought in close contact with an inner surface of the handle part 10. The elastic band 50 makes the two pieces of the handle part 10 brought into close contact without being separated, and the elastic surface 34a makes the area of a hole through which the switch 34 passes reduced. With such airtight means, the clearance of the surgical retractor 2 is significantly reduced. Accordingly, it is possible to prevent the patient's body fluid from flowing into the surgical retractor 2, and the surgical retractor 2 can suck in smoke through its internal space even when a suction tube (not shown) is not provided in the surgical retractor 2.

Although not shown, the distance from the distal end of the blade part 200 to at least one of the suction channels may be different from the distance to the other suction channel.

The above description is merely an illustrative explanation of the technical idea of the present disclosure, and various modifications, changes, and substitutions can be made by an ordinary skilled person in the art to which the present disclosure pertains without departing from the essential characteristics of the present disclosure. Therefore, the present embodiments are intended to illustrate and not to limit the technical idea of the present disclosure, and the scope of the technical idea of the present disclosure is not limited by these embodiments. The protection scope of the present disclosure should be interpreted in accordance with the following claims, and all technical ideas within the equivalent scope should be construed as being included in the scope of the present disclosure.

DESCRIPTION OF REFERENCE NUMERALS

1: surgical retractor
100: handle part
130: connection port
200: blade part
211a: support plate
212: handle insertion portion
222a: suction hole
310: light source
400: suction channel
410: suction tube
420: suction pin

What is claimed is:

1. A surgical retractor comprising:
   a handle part;
   a blade part coupled to one end of the handle part at a predetermined angle with the handle part and having a suction hole;
   a lighting unit including at least one light source disposed on the blade part;
   a connection port coupled to the handle part or the blade part, having an outlet hole, and configured to be connected to an external negative pressure device; and
   a suction channel for guiding smoke from the suction hole to the outlet hole,
   wherein an end portion of the suction channel on the suction hole side forms a predetermined angle with a longitudinal direction of the blade part,
   wherein the suction channel includes a suction tube at least a portion of which is inserted into the blade part, and a suction pin that has a bent portion bent at a predetermined angle and is at least partially inserted into an end portion of the suction tube on the suction hole side, and
   wherein the suction pin includes an insertion pin inserted into the suction tube, a first outer diameter portion disposed outside the suction tube and having a first outer diameter larger than an inner diameter of the suction tube, a second outer diameter portion having a second outer diameter larger than the first outer diameter, and a third outer diameter portion having a third outer diameter larger than the first outer diameter and being spaced apart from the second outer diameter portion,
   the insertion pin is provided with several protrusions formed along the longitudinal direction of the insertion pin, an outer diameter of the protrusions being gradually reduced as it goes toward an inner side of the suction tube,
   the second outer diameter portion and the third outer diameter portion are larger than a width of the suction hole, and
   the suction hole is disposed between the second outer diameter portion and the third outer diameter portion.

2. The surgical retractor of claim 1, wherein the suction hole and the light source are spaced apart from each other in the longitudinal direction.

3. The surgical retractor of claim 2, wherein the suction hole is disposed closer to a distal end of the blade part than the light source.

4. The surgical retractor of claim 1, wherein the blade part includes a support plate extending in the longitudinal direction and a handle insertion portion extending from an end of the support plate on the handle part side toward the handle part,
   the handle part includes a mounting portion protruding inward from an end of the handle part on the blade part side,
   a mounting hole is formed on the handle insertion portion at a position corresponding to a position of the mounting portion, and
   the handle insertion portion is inserted into the handle part and the mounting portion is inserted into the mounting hole.

* * * * *